(12) United States Patent
Hairer et al.

(10) Patent No.: US 12,280,848 B2
(45) Date of Patent: Apr. 22, 2025

(54) LEANING VEHICLE

(71) Applicant: Bayerische Motoren Werke Aktiengesellschaft, Munich (DE)

(72) Inventors: Michael Hairer, Munich (DE); Klaus Ottillinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/689,208

(22) PCT Filed: Sep. 23, 2022

(86) PCT No.: PCT/EP2022/076490
§ 371 (c)(1),
(2) Date: Mar. 5, 2024

(87) PCT Pub. No.: WO2023/066598
PCT Pub. Date: Apr. 27, 2023

(65) Prior Publication Data
US 2024/0383554 A1    Nov. 21, 2024

(30) Foreign Application Priority Data
Oct. 20, 2021   (DE) ..................... 10 2021 127 167.3

(51) Int. Cl.
*B62J 6/055*   (2020.01)

(52) U.S. Cl.
CPC ..................... *B62J 6/055* (2020.02)

(58) Field of Classification Search
CPC ...... B62J 6/055; B62J 6/05; B62J 6/00; F21V 17/00; F21V 17/08; F21V 17/16;
(Continued)

(56) References Cited

U.S. PATENT DOCUMENTS

| 6,081,190 A * | 6/2000 | Kellermann | B62J 6/055 340/432 |
| 2004/0040407 A1* | 3/2004 | Chen | B62J 6/055 74/551.9 |

(Continued)

FOREIGN PATENT DOCUMENTS

| DE | 10 2018 205 838 A1 | 10/2019 |
| DE | 10 2019 213 868 B4 | 4/2021 |

(Continued)

OTHER PUBLICATIONS

International Search Report (PCT/ISA/210) issued in PCT Application No. PCT/EP2022/076490 dated Dec. 5, 2022 with English translation (5 pages).

(Continued)

*Primary Examiner* — Bao Q Truong
(74) *Attorney, Agent, or Firm* — Crowell & Moring LLP

(57) ABSTRACT

The invention relates to a leaning vehicle, having at least one vehicle component, such as a swing arm or handlebar, which has a receiving portion, having at least one illumination unit which comprises a head portion, in which or on which at least one indicating means is arranged, and which comprises a foot portion and which comprises a joining portion which is arranged on the foot portion and which runs parallel to the receiving portion of the vehicle component and with which the illumination unit is secured on the receiving portion of the vehicle component, wherein the illumination unit can be (Continued)

secured on the receiving portion along a joining direction running transversely or obliquely to the longitudinal axis of the leaning vehicle, and wherein the illumination unit comprises its longest extent in a direction parallel to the joining direction, and having at least one reinforcing means which is secured on the receiving portion of the vehicle component, wherein said reinforcing means lies at least in sections transversely to the joining direction against a coupling surface of the foot portion of the illumination unit so as to be in surface contact with said coupling surface, and wherein said reinforcing means surrounds the foot portion at least in sections circumferentially.

10 Claims, 3 Drawing Sheets

(58) Field of Classification Search
CPC . B60Q 1/26; F21W 2103/00; F21W 2107/13; F21W 2107/17
See application file for complete search history.

(56) References Cited

U.S. PATENT DOCUMENTS

| 2019/0111990 A1* | 4/2019 | Kudo | B62K 19/30 |
| 2020/0096168 A1 | 3/2020 | Matsumoto et al. | |

FOREIGN PATENT DOCUMENTS

| DE | 11 2019 004 861 T5 | 6/2021 |
| EP | 2 168 850 B1 | 6/2013 |
| JP | 61-106493 U | 7/1986 |

OTHER PUBLICATIONS

German-language Written Opinion (PCT/ISA/237) issued in PCT Application No. PCT/EP2022/076490 dated Dec. 5, 2022 with English translation (8 pages).
German-language Search Report issued in German Application No. 10 2021 127 167.3 dated Jun. 27, 2022 with partial English translation (10 pages).

* cited by examiner

LEANING VEHICLE

BACKGROUND AND SUMMARY

The disclosure relates to a leaning vehicle. In leaning vehicles, in particular in motorcycles, it is known to fasten functionally integrated flashing lights in a rear region of a frame so as to be fixed to the frame.

In the region, the vehicle frame can comprise a swingarm which is designed to be sprung and damped with respect to the rest of the vehicle frame. This makes it possible to damp and cushion roadway excitations, as a result of which a risk of damage or a reduction in the service life of the functionally integrated flashing light is reduced.

An object of an exemplary embodiment of an disclosure is to propose a leaning vehicle in which the service life of a functionally integrated flashing light is increased, in particular if the latter is fastened to an unsprung and undamped vehicle component.

This and other objects are achieved by a leaning vehicle, having at least one vehicle component, such as a swingarm or handlebar, which has a receiving portion, having at least one illumination unit which comprises a head portion, in which or on which at least one indicating means is arranged, and which comprises a foot portion and which comprises a joining portion which is arranged on the foot portion and which runs parallel to the receiving portion of the vehicle component and with which the illumination unit is fastened to the receiving portion of the vehicle component, wherein the illumination unit can be fastened to the receiving portion along a joining direction running transversely or obliquely to the longitudinal axis of the leaning vehicle, and wherein the illumination unit comprises its longest extent in a direction parallel to the joining direction, and having at least one reinforcing means which is fastened to the receiving portion of the vehicle component, wherein said reinforcing means lies at least in sections transversely to the joining direction against a coupling surface of the foot portion of the illumination unit so as to be in surface contact with said coupling surface, and wherein said reinforcing means circumferentially surrounds the foot portion at least in sections.

By virtue of the fact that the leaning vehicle comprises a reinforcing means which is fastened to the receiving portion of the vehicle component and here lies at least in sections transversely to the joining direction against a coupling surface of the foot portion of the illumination unit so as to be in surface contact with said coupling portion and circumferentially surrounds the foot portion at least in sections, the illumination unit is supported and reinforced by the reinforcing means, in particular in the region of the foot portion. As a result, the risk of the illumination unit breaking off, in particular in the region of the foot portion, is reduced and the service life of the illumination unit is increased.

The vehicle component can be a vehicle swingarm. This can be designed to be damped and cushioned or to be undamped and uncushioned. In particular, the swingarm can be arranged in the region of a rear of the vehicle.

The illumination unit can be a functional unit of any desired design by means of which information for other road users, in particular road users following the leaning vehicle, can be indicated by the indicating means. In such a case, the indicating means can comprise a light, in particular a headlamp, or a repeating flashing light or a screen or a display.

In one embodiment of the leaning vehicle, the illumination unit comprises a repeating flashing light which is functionally integrated in the leaning vehicle and which is fastened in an uncushioned and undamped manner to a vehicle component designed as a frame-mounted swingarm.

A leaning vehicle is understood to mean bicycles, motorcycles or motorcycle-like motor vehicles, such as motor scooters, in particular two-, three- or four-wheeled motor scooters, scooters, leanable trikes, quad bikes or the like.

It is conceivable that the reinforcing means lies, in particular with surface contact, only against the foot portion of the illumination unit. The reinforcement of the illumination unit by the reinforcing means can be improved if the reinforcing means is fastened, in particular in a form-fitting, integrally bonded and/or force-fitting manner, to the foot portion of the illumination unit.

If the reinforcing means is fastened to the foot portion of the illumination unit in an integrally bonded manner, the reinforcing means can be attached to the illumination unit by welding, soldering, adhesive bonding or the like.

If the reinforcing means is fastened to the illumination unit in a form-fitting manner, it is possible, at least in the directions in which a movement amplitude of the illumination unit is expected during operation of the leaning vehicle, for a rear grip to be formed with respect to the respective movement direction.

If the reinforcing means is fastened to the illumination unit in a force-fitting manner, reinforcement can be achieved on account of the friction prevailing between the reinforcing means and illumination unit.

In a development of the last-mentioned embodiments, it proves to be advantageous if the reinforcing means comprises at least one elastically bendable fastening element which, upon transferring the reinforcing means along a coupling direction, can be displaced into a coupled arrangement transversely to the coupling direction and, in the coupled arrangement, can be automatically moved into the nondisplaced arrangement, and which, in the coupled arrangement, engages behind a recess on the foot portion of the illumination unit with respect to the coupling direction.

If the reinforcing means comprises at least one elastically bendable fastening element, the reinforcing means can be firmly clipped on the foot portion of the illumination unit in a simple manner. Here, upon transfer of the reinforcing means along the coupling direction, the elastically bendable fastening element is displaced transversely to the coupling direction and, upon reaching the coupled arrangement, automatically latches back into the nondisplaced arrangement and engages behind the foot portion on the recess. As a result, the reinforcing means and illumination unit can be coupled to one another simply in a form-fitting and/or force-fitting manner.

In order to further improve fastening of the reinforcing means to the illumination unit, in one embodiment of the leaning vehicle the reinforcing means comprises at least two fastening elements and the foot portion of the illumination unit comprises at least two recesses, wherein, in the coupled arrangement, the foot portion is arranged between the two fastening elements, and wherein the two fastening elements have a U-shaped or clip-like cross section, and/or wherein the at least two fastening elements comprise at the respectively free ends a hook-like portion which extends in the direction of the free end of the opposite fastening element and which, in the coupled arrangement, lies against the respective recess of the foot portion.

The at least one fastening element can comprise its longest extent parallel to the direction of travel of the leaning vehicle. Furthermore, embodiments are conceivable in which the fastening element comprises its longest extent parallel or obliquely to the vertical axis or transverse axis.

Moreover, a form-fitting and/or force-fitting connection transversely to the coupling direction can be ensured in a simple manner if, on the side facing the coupling surface of the foot portion, the at least one fastening element of the reinforcing means comprises at least one projection extending in the direction of the coupling surface of the foot portion and/or if, on the side facing the fastening element of the reinforcing means, the at least one foot portion comprises at least one aperture in the coupling surface which is formed in a corresponding, in particular complementary, manner to the projection of the fastening element and in which the projection is arranged to engage in the joined arrangement.

By virtue of the aperture in the coupling surface of the foot portion of the illumination unit, the fastening element with the at least one projection can be guided upon transfer along the coupling direction. Moreover, by virtue of the at least one projection, the at least one fastening element, owing to the arrangement of the projection in the aperture, is fastened against a movement transversely to the coupling direction.

Moreover, in further embodiments of the leaning vehicle, there is provision that the at least one fastening element comprises a plurality of projections arranged so as to extend with respect to one another, in particular parallel to one another, and the foot portion comprises a plurality of apertures arranged so as to extend with respect to one another, in particular parallel to one another, wherein, in the joined arrangement, a respective projection in a respective aperture is arranged to engage therein.

In order to fasten the reinforcing means to the vehicle component in a simple manner, it proves to be advantageous if the reinforcing means comprises a coupling portion which runs parallel to the receiving portion of the vehicle component and which comprises at least one opening by means of which the reinforcing means can be releasably fastened to the receiving portion of the vehicle component by a fastening means.

The at least one fastening means can, for example, comprise a screw or a bolt which can be plugged through the opening in the coupling portion of the reinforcing means and can be fastened by a nut on that side of the receiving portion of the vehicle component which faces away from the reinforcing means.

Furthermore, the illumination unit can be fastened to the vehicle component in a simple manner if the joining portion of the illumination unit comprises at least one cutout by means of which the illumination unit can be releasably fastened to the receiving portion of the vehicle component by a further fastening means and/or if the joining portion of the illumination unit projects beyond the coupling surface of the foot portion in the joined arrangement in the direction of the reinforcing means.

Here too, the fastening means can comprise a screw or bolt by means of which the joining portion of the illumination unit can be fastened with a nut on that side of the receiving portion of the vehicle component which faces away from the illumination unit. By virtue of the fact that the joining portion of the illumination unit projects beyond the coupling surface of the foot portion in the joined arrangement in the direction of the reinforcing means, the foot portion can be dimensioned independently of the joining portion.

In principle, it is conceivable that, when joining the illumination unit and the reinforcing means to the receiving portion of the vehicle component, first of all the illumination unit is fastened to the receiving portion and the reinforcing means is fastened in a subsequent step. In such a case, as viewed transversely to the joining direction, the reinforcing means can cover or at least partially overlap the joining portion of the illumination unit in the joined arrangement.

In order to be able to arrange the illumination unit independently of the arrangement of the reinforcing means on the receiving portion of the vehicle component, there is provision in a development of the leaning vehicle that the reinforcing means comprises, between the two fastening elements, a continuous clearance which overlaps with the joining portion of the illumination unit and through which the joining portion of the illumination unit is externally accessible at least in part, in particular in the region of the cutout.

The clearance makes it possible for the fastening means to be plugged and screwed through the cutout of the joining portion of the illumination unit. This also makes it possible to join the reinforcing means and illumination unit to one another before fastening to the receiving portion of the vehicle component. As a result, the illumination unit and reinforcing means can be preassembled and, in the preassembled arrangement, can be fastened, in each case individually or jointly, to the receiving portion of the vehicle component.

In order to improve force absorption or cushioning or damping by the reinforcing means, the reinforcing means of one exemplary embodiment of the leaning vehicle comprises at least one rib-like supporting element which extends from the at least one fastening element to the coupling portion and which comprises a wedge-shaped cross section in a plane running parallel to an axis through the joining direction.

The leaning vehicle can be of compact design if the reinforcing means, in particular the at least one fastening element, the at least one coupling portion and/or the at least one supporting element, form a common one-piece component, in particular an injection-molded component.

Further features, details and advantages of the disclosure will emerge from the appended patent claims, from the graphic representation and following description of a preferred embodiment of the leaning vehicle.

In the drawings:

DETAILED DESCRIPTION OF THE DRAWINGS

Figure 1:
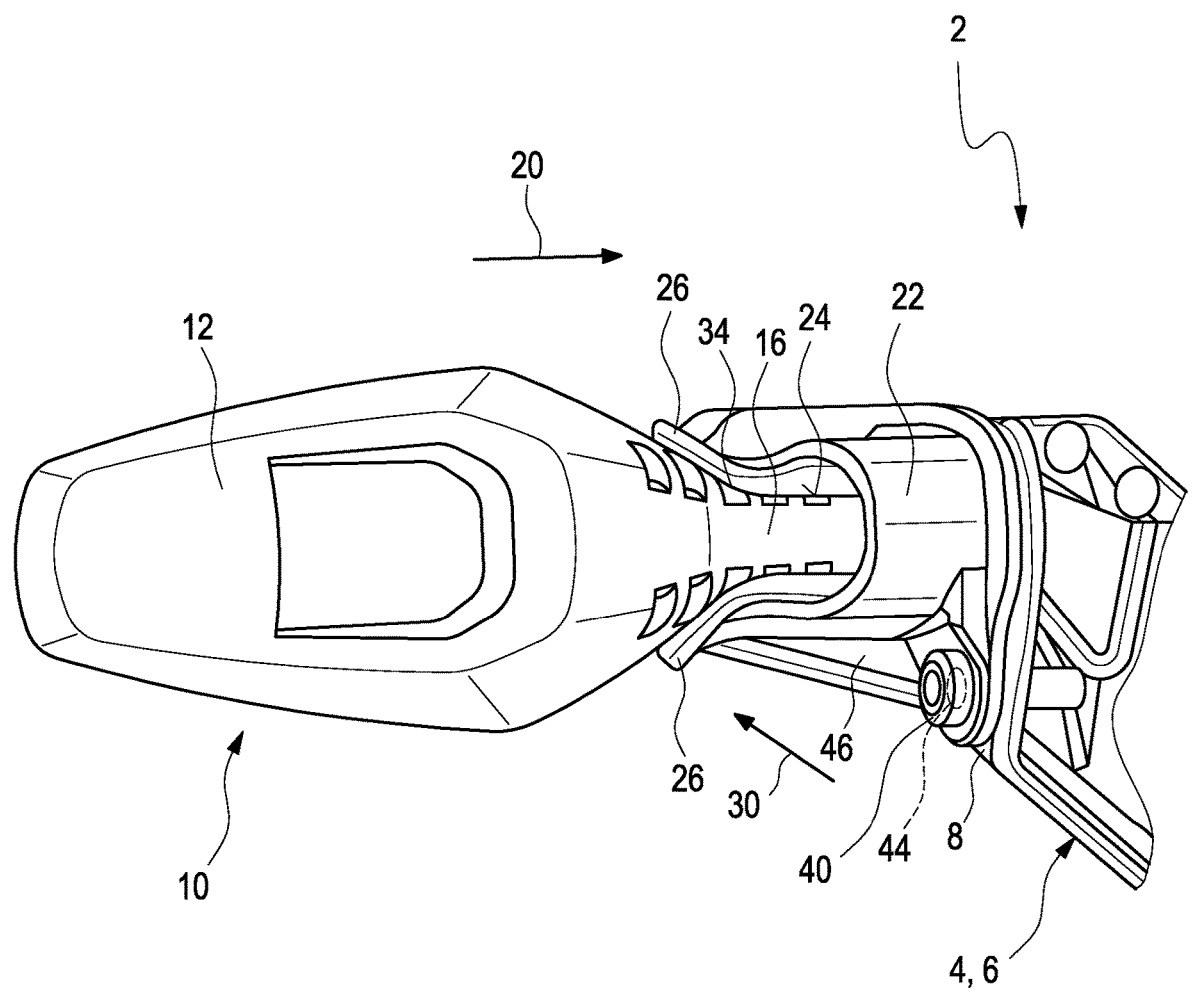
FIG. 1 shows a perspective rear view of an exemplary embodiment of a subregion of the leaning vehicle.
Figure 2:
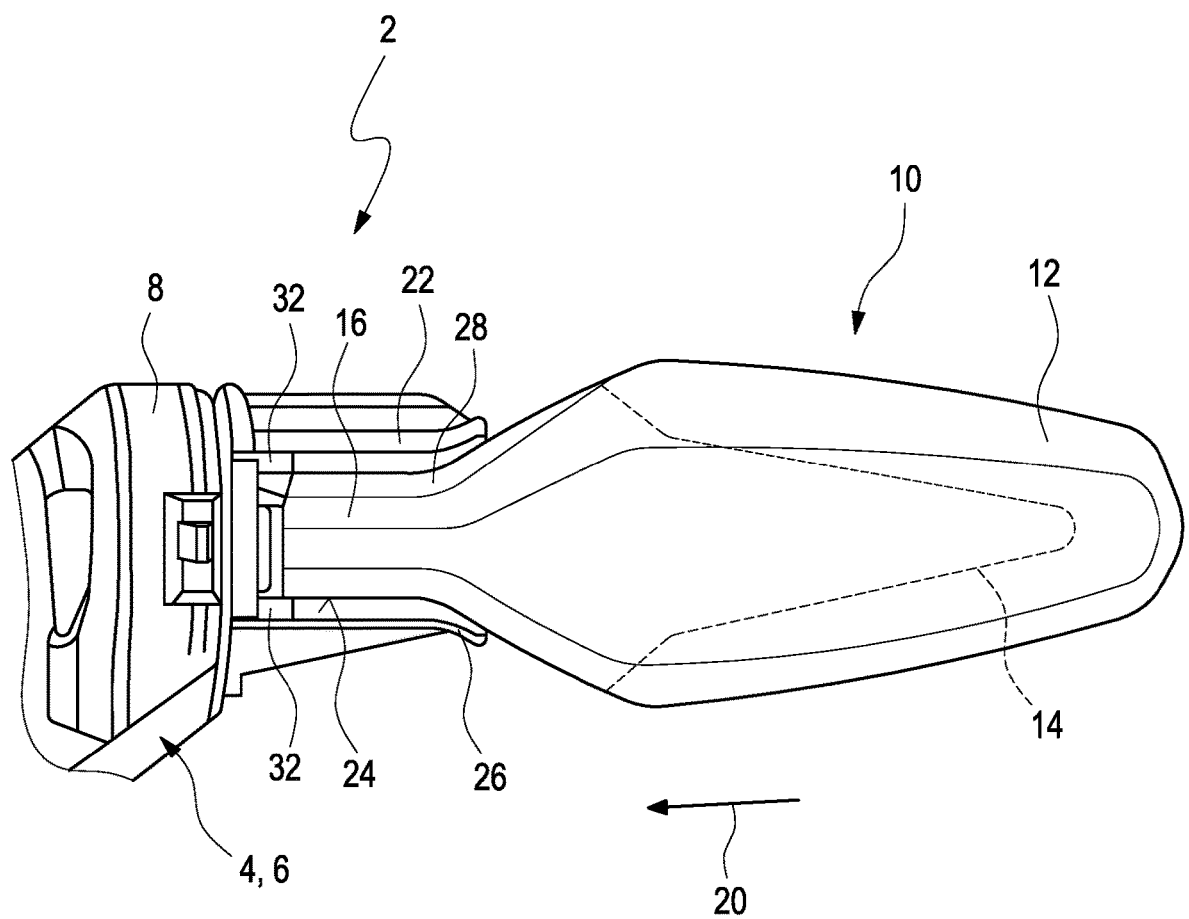
FIG. 2 shows a perspective front view of the exemplary embodiment according to FIG. 1.

The figures show a detail of a leaning vehicle (only an excerpt of which is illustrated in the figures) provided overall with the reference sign 2. The leaning vehicle 2 comprises at least one vehicle component 4 which, in the exemplary embodiment shown in the figures, comprises a swingarm 6. The vehicle component 4 comprises a receiving portion 8.

Moreover, the leaning vehicle 2 comprises an illumination unit 10 which includes a head portion 12 in which or on which at least one indicating means 14 is arranged. Moreover, the illumination unit 10 comprises a foot portion 16 and a joining portion 18 which is arranged on the foot portion 16 and with which the illumination unit 10 is fastened to the receiving portion 8 of the vehicle component 4.

The illumination unit 10 can be fastened to the receiving portion 8 along a joining direction 20 running transversely or obliquely to the longitudinal axis of the leaning vehicle 2. Moreover, the illumination unit 10 comprises its longest extent parallel to the joining direction 20.

Furthermore, the leaning vehicle 2 comprises a reinforcing means 22 which is fastened to the receiving portion 8 of the vehicle component 4. Here, the reinforcing means 22 lies in sections transversely to the joining direction 20 against a coupling surface 24 of the foot portion 16 of the illumination unit 10 so as to be in surface contact with said coupling surface and circumferentially surrounds the foot portion 16 at least in sections.

In the exemplary embodiment shown in the figures, the reinforcing means 22 comprises two elastically bendable fastening elements 26 which, in a coupled arrangement on a recess 28 of the foot portion 16 of the illumination unit 10, form a rear grip with respect to a coupling direction 30. On the fastening elements 26 there is formed a hook-like portion 32 which, in the joined arrangement, lies against the respective recess 28 of the respective foot portion 16.

Moreover, in the exemplary embodiment shown in the figures, the reinforcing means 22 comprises a plurality of projections 34 which extend parallel to the coupling direction 30 and which engage in apertures 36 in the coupling surface 24 of the foot portion 16 of the illumination unit 10 that are formed in a corresponding, in particular complementary, manner.

Figure 3:
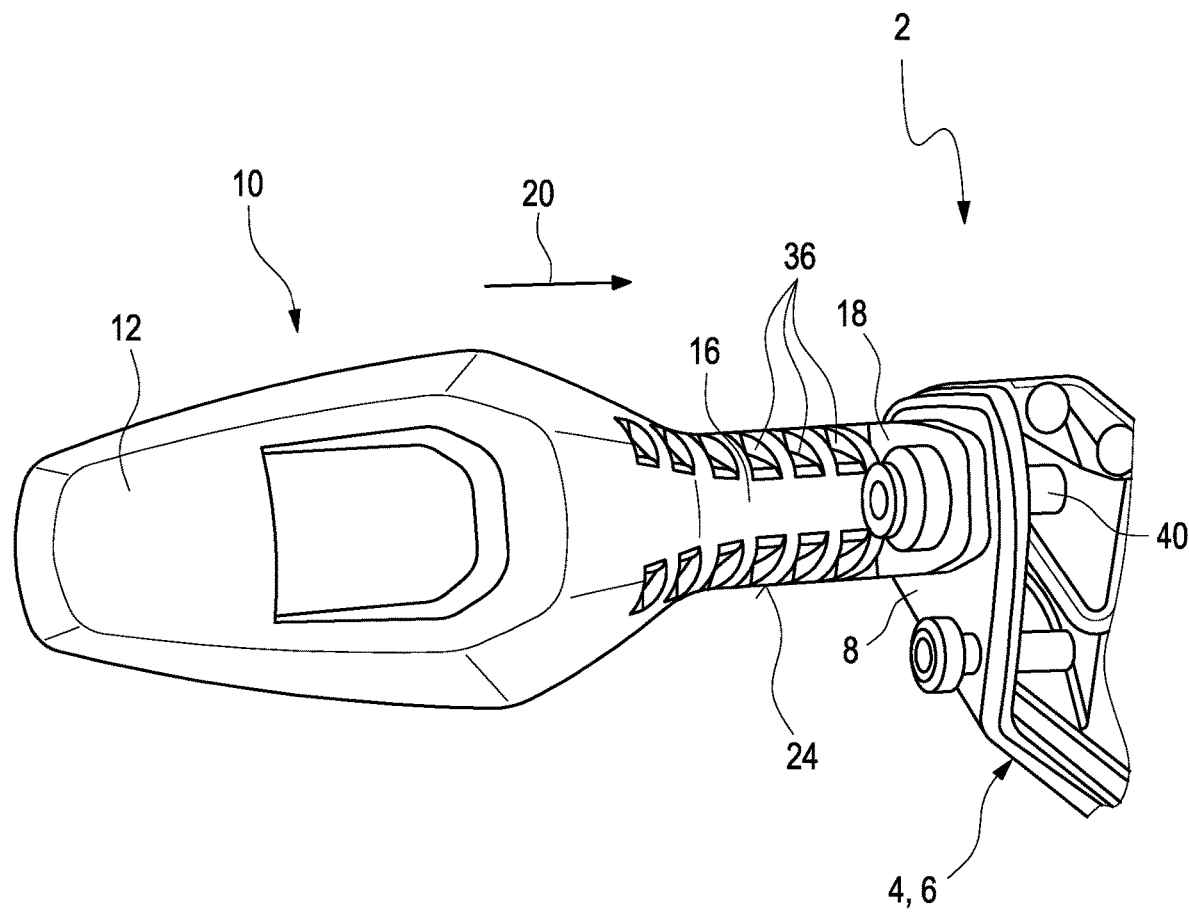
FIG. 3 shows a perspective rear view of the exemplary embodiment according to FIG. 1 without reinforcing means.

Moreover, the reinforcing means 22 comprises, between the two fastening elements 26, a continuous clearance 38 through which the joining portion 18 of the illumination unit 10 is externally accessible. As can be seen in FIG. 3, in such a case a fastening means 40 can be arranged on the joining portion 18 of the illumination unit 10 even when the reinforcing means 22 has already been coupled to the illumination unit 10.

In order to fasten the reinforcing means 22 to the receiving portion 8 of the vehicle component 4, the reinforcing means 22 comprises a coupling portion 42 which comprises at least one opening 44 through which a fastening means 40 can be plugged and fastening to the receiving portion 8 of the vehicle component 4 is made possible.

In order to increase absorption of forces from the combination of illumination unit 10 and reinforcing means 22, the reinforcing means 22 comprises at least one rib-like supporting element 46 which extends from the at least one fastening element 26 to the coupling portion 42.

In the text which follows, the mode of operation of the leaning vehicle according to the disclosure will be briefly described:

Before arranging the illumination unit 10 on the vehicle component 4, the reinforcing means 22 is attached to the illumination unit 10. By pressing the reinforcing means 22 along the coupling direction 30, the two fastening elements 26 of the reinforcing means 22 are displaced elastically transversely to the coupling direction 30 and latch with the illumination unit 10 upon reaching the recesses 28 on the foot portion 16. Once joined in such a way, both the illumination unit 10 and reinforcing means 22 are screwed via fastening means 40 by screwing the joining portion 18 of the illumination unit 10 and joining the coupling portion 42 of the reinforcing means 22 to the receiving portion 8 of the vehicle component 4.

The features of the disclosure which are disclosed in the above description, in the claims and in the drawing may be essential both individually and in any desired combination in the implementation of the disclosure in its various embodiments.

List of Reference Signs

2 Leaning vehicle
4 Vehicle component
6 Swingarm
8 Receiving portion
10 Illumination unit
12 Head portion
14 Indicating means
16 Foot portion
18 Joining portion
20 Joining direction
22 Reinforcing means
24 Coupling surface
26 Fastening element
28 Recess
30 Coupling direction
32 Hook-like portion
34 Projection
36 Aperture
38 Clearance
40 Fastening means
42 Coupling portion
44 Opening
46 Supporting element

The invention claimed is:

1. A vehicle component of a leaning vehicle comprising:
a receiving portion; and
at least one illumination unit which comprises a head portion, in which or on which at least one indicating means is arranged, and which comprises a foot portion and which comprises a joining portion which is arranged on the foot portion and which runs parallel to the receiving portion of the vehicle component and with which the illumination unit is fastened to the receiving portion of the vehicle component, wherein
the illumination unit is fastenable to the receiving portion along a joining direction running transversely or obliquely to the longitudinal axis of the leaning vehicle,
the illumination unit comprises its longest extent in a direction parallel to the joining direction, and having at least one reinforcing means which is fastened to the receiving portion of the vehicle component,
the reinforcing means lies at least in sections transversely to the joining direction against a coupling surface of the foot portion of the illumination unit so as to be in surface contact with the coupling surface,
the reinforcing means circumferentially surrounds the foot portion at least in sections, and
the reinforcing means comprises at least one elastically bendable fastening element.

2. The vehicle component according to claim 1, wherein the reinforcing means is fastened, in a form-fitting, integrally bonded and/or force-fitting manner, to the foot portion of the illumination unit.

3. The leaning vehicle according to claim 2, wherein the at least one elastically bendable fastening element, upon transferring the reinforcing means along a coupling direction, is displaceable into a coupled arrangement transversely to the coupling direction and, in the coupled arrangement, is automatically moveable into the nondisplaced arrangement, and which, in the coupled arrangement, engages behind a recess on the foot portion of the illumination unit with respect to the coupling direction.

4. The leaning vehicle according to claim 3, wherein the reinforcing means comprises at least two fastening elements and the foot portion of the illumination unit comprises at least two recesses, wherein in the coupled arrangement, the foot portion is arranged between the two fastening elements, and wherein the two fastening elements have a U-shaped or clip-like cross section, and/or in that the at least two fastening elements comprise at the respectively free ends a hook-like portion which extends in a direction of the free end of the opposite fastening element and which, in the coupled arrangement, lies against the respective recess of the foot portion.

5. The leaning vehicle according to claim 4, wherein on the side facing the coupling surface of the foot portion, the at least one fastening element of the reinforcing means comprises at least one projection extending in the direction of the coupling surface of the foot portion and/or in that, on the side facing the fastening element of the reinforcing means, the at least one foot portion comprises at least one aperture in the coupling surface which is formed in a complementary manner to the projection of the fastening element and in which the projection is configured to engage in the joined arrangement.

6. The leaning vehicle according to claim 5, wherein the reinforcing means comprises a coupling portion which runs parallel to the receiving portion of the vehicle component and which comprises at least one opening via which the reinforcing means is releasably fastened to the receiving portion of the vehicle component by a fastening means.

7. The leaning vehicle according to claim 6, wherein the joining portion of the illumination unit comprises at least one cutout by means of which the illumination unit is releasably fastened to the receiving portion of the vehicle component by a further fastening means, and/or in that the joining portion of the illumination unit projects beyond the coupling surface of the foot portion in the joined arrangement in the direction of the reinforcing means.

8. The leaning vehicle according to claim 7, wherein the reinforcing means comprises, between the two fastening elements, a continuous clearance which overlaps with the joining portion of the illumination unit and through which the joining portion of the illumination unit is externally accessible at least in part in the region of the cutout.

9. The leaning vehicle according to claim 8, wherein the reinforcing means comprises at least one rib-like supporting element which extends from the at least one fastening element to the coupling portion and which comprises a wedge-shaped cross section in a plane running parallel to an axis through the joining direction.

10. The leaning vehicle according to claim 9, wherein the at least one fastening element, the at least one coupling portion and/or the at least one supporting element, form a common one-piece injection-molded component.

* * * * *